United States Patent

Kajiyama et al.

[11] Patent Number: 5,579,135
[45] Date of Patent: Nov. 26, 1996

[54] OPTICAL ELEMENT

[75] Inventors: Tisato Kajiyama; Hirotsugu Kikuchi, both of Fukuokaken; Satoshi Tanioka, Chibaken, all of Japan

[73] Assignee: Chisso Corporation, Osaka, Japan

[21] Appl. No.: 542,503

[22] Filed: Oct. 13, 1995

Related U.S. Application Data

[63] Continuation-in-part of Ser. No. 84,133, Jul. 1, 1993, abandoned.

[30] Foreign Application Priority Data

Jul. 6, 1992 [JP] Japan ................................. 4-202029

[51] Int. Cl.$^6$ .......................................................... G02F 1/13
[52] U.S. Cl. ............................ 359/52; 359/51; 359/45; 359/44
[58] Field of Search ................................ 359/51, 52, 99, 359/103, 44, 45; 428/1

[56] References Cited

U.S. PATENT DOCUMENTS

| | | | |
|---|---|---|---|
| 4,671,618 | 6/1987 | Wu et al. ........................... | 359/52 |
| 4,685,771 | 8/1987 | West et al. ......................... | 359/51 |
| 5,004,323 | 4/1991 | West ................................. | 359/51 |
| 5,124,183 | 6/1992 | Nakano et al. ..................... | 428/1 |
| 5,200,107 | 4/1993 | Piermattie et al. ................. | 252/299.01 |
| 5,216,530 | 6/1993 | Pearlman et al. .................. | 359/51 |
| 5,289,300 | 2/1994 | Yamazaki et al. ................. | 359/51 |
| 5,319,481 | 6/1974 | Fergason ........................... | 359/51 |

FOREIGN PATENT DOCUMENTS 2226174  6/1990  United Kingdom .................... 359/96

OTHER PUBLICATIONS

Dixon et al, "Liquid Crystal–Rubber dispersions", Mol. Cryst.Liq. Cryst., 1976 vol. 37, pp. 233–240.

*Primary Examiner*—William L. Sikes
*Assistant Examiner*—Kenneth Parker
*Attorney, Agent, or Firm*—Lowe, Price, LeBlanc & Becker

[57] ABSTRACT

An optical element which comprises a liquid crystal dispersion film layer which is composed of a spongy matrix polymer and a liquid crystal such that they become separated at use temperatures and mixed at high temperatures. The mixture remains mixed upon quenching but gets phase separated upon slow cooling. The optical element produces an electro-optic effect and permits heat-mode recording.

14 Claims, 10 Drawing Sheets

CROSS SECTION OF NEW OPTICAL ELEMENT

1 LIQUID CRYSTAL DISPERSION FILM LAYER
3 PROTECTIVE SUBSTRATE
2 ELECTRICALLY CONDUCTIVE LAYER

Where $T_h$ is the heating temperature, $T_c$ is the cooling temperature, $t_h$ is the heating time, $t_c$ is the cooling time.

as cast
($T_h < T_{NI}$)

heating temp. 333K
($T_h < T_{NI}$)

heating temp. 343K
($T_h > T_{NI}$)
|—— 2.5μm ——| heating temp. 369K
($T_h > T_{NI}$)
GR-63 wt.fraction of 0.6
thickness 18μm
cooling temp. 273K Where Th is the heating temperature, Tc is the cooling temperature, th is the heating time, tc is the cooling time.

cooling temp. 273K
$(T_C < T_{NI})$ cooling temp. 323K
$(T_C < T_{NI})$ cooling temp. 333K
$(T_C < T_{NI})$

|—— 2.5μm ——| cooling temp. 343K
$(T_C > T_{NI})$
GR-63 wt.fraction of 0.6
thickness 18μm
heating temp. 369K

OPTICAL ELEMENT

This application is a continuation-in-part of U.S. Ser. No. 08/084,133 filed Jul. 1, 1993, now abandoned.

FIELD OF THE INVENTION

The present invention relates to a new optical element which produces an electro-optic effect and is capable of heat-mode recording.

DESCRIPTION OF THE PRIOR ART

There have been known several optical elements which change in optical properties, such as scattering, absorption, and reflection, upon application of an electric field. They are in general use as display units and optical shutters.

These electro-optic elements are based on a liquid crystal held uniformly thin between two substrates, said liquid crystal changing in optical properties by electrical means. They present difficulties if they are to be made large in area, and they also pose problems with strength and weight.

In order to eliminate these disadvantages, there have been proposed several ideas. For example, Japanese Patent Laid-open No. 4,789/1987 discloses an electro-optic element which is made up of a liquid crystal sealed in capsules which are dispersed in a medium. Also, Japanese Patent Laid-open No. 309025/1989 discloses an electro-optic element in film form which is made up of a spongy polymeric matrix and a liquid crystal dispersed therein. These disclosures, however, do not teach nor suggest the possibility of using the electro-optic elements as recording elements.

On the other hand, there are known heat-mode recording elements which change in optical properties, such as scattering, absorption, and reflection, upon application of heat. They are in general use as over-head projector displays and optical recording discs.

These recording elements generally undergo change in shape due to melting or evaporation inducted by heat application or change in structure, such as phase or aggregation, induced by heat application. Such optical changes are detectable and hence utilized for recording. Recording in this manner offers several practical advantages of requiring no chemical treatment (due to dry process), being capable of real-time recording, and permitting high-density large-capacity recording (in the case where a condensed laser beam is used as a heat source). There has recently been proposed an element capable of repeated writing and erasing.

These heat-mode recording elements are conventionally thin film of a low-melting metal (such as bismuth and tellurium), thin film of an organic compound (such as pigment), or composite thin film of more than one organic compound. However, nothing has been taught or suggested about the possibility of using these recording elements as electro-optic elements.

SUMMARY OF THE INVENTION

It is an object of the present invention to provide an optical element which functions as an electro-optic element as well as a heat-mode recording element. It will meet the varied requirements for materials.

The present inventors carried out a series of researches on this optical element. As the result, it was found that the object is achieved if the optical element is composed of a specific liquid crystal dispersion film, two conducting layers, and a protective substrate, the first one being composed of a spongy matrix polymer and a liquid crystal such that they become separated at use temperatures and mixed at high temperatures, wherein the liquid crystal dispersion film layer becomes transparent upon the application of heat and remains transparent upon quenching because the liquid crystal and spongy matrix polymer are still mixed, and wherein the liquid crystal dispersion film layer returns to a phase-separated state upon slow cooling. This finding led to the present invention.

DESCRIPTION OF THE PREFERRED EMBODIMENTS

Figure 1:
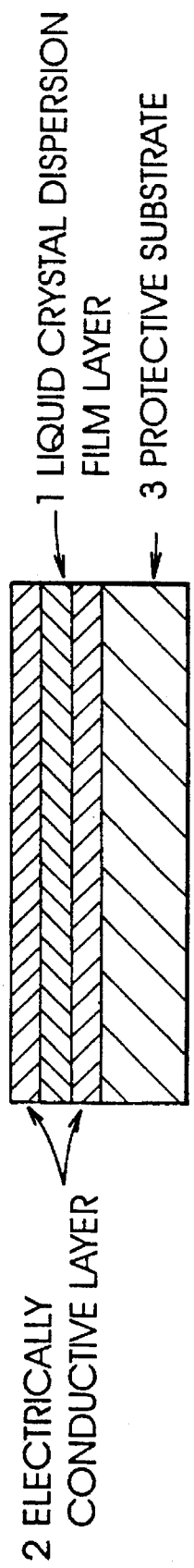
FIG. 1 is a sectional view of the optical element pertaining to the present invention.

The first aspect of the present invention resides in an optical element which comprises a liquid crystal dispersion film layer which is composed of a spongy matrix polymer and a liquid crystal such that they become separated at use temperatures and mixed at high temperatures, wherein the liquid crystal dispersion film layer becomes transparent upon the application of heat and remains transparent upon quenching because the liquid crystal and spongy matrix polymer are still mixed, and wherein the liquid crystal dispersion film layer returns to a phase-separated state upon slow cooling.

The second aspect of the present invention resides in an optical element as defined in the first aspect in which the liquid crystal dispersion film layer is interposed between electrically conductive layers.

The third aspect of the present invention resides in an optical element as defined in the first aspect in which the liquid crystal dispersion film layer is provided with a light-absorbing metal layer on one or both sides thereof.

The fourth aspect of the present invention resides in an optical element as defined in the first aspect in which the liquid crystal dispersion film layer contains light-absorbing molecules or particles.

The present invention is embodied in an optical element which has a liquid crystal dispersion film layer composed of a spongy matrix polymer and a liquid crystal.

Typical examples of the matrix polymer include thermoplastic resins (such as vinyl chloride resin, carbonate resin, methacrylate resin, vinyl acetate resin (and hydrolyzate thereof), cellulosic resin, linear polyester resin, styrene resin, amide resin, nitrile resin, and acetal resin), synthetic and natural rubbers (such as SBR rubber, butadiene rubber, butyl rubber, isoprene rubber, acrylic rubber, nitrile rubber, urethane rubber, fluororubber, chloroprene rubber, and silicone rubber), and thermosetting resins (such as unsaturated polyester resin, urethane resin, urea resin, melamine resin, phenolic resin, epoxy resin, alkyd resin, and crosslinked thermoplastic resins).

The matrix polymer for optical use should preferably have a light transmittance higher than 50%, more desirably higher than 80%. Moreover, the matrix polymer should preferably have a refractive index which is close to that of the liquid crystal. The difference between two refractive indices should be smaller than 0.5, preferably smaller than 0.3. The matrix polymer may be used alone or in combination with that of different type.

There are no specific restrictions on the liquid crystal as a constituent of the liquid crystal dispersion film layer. Any liquid crystal may be used in this invention so long as it is miscible with the matrix polymer such that they become separated at use temperatures and mixed at high temperatures. The liquid crystal may be one which takes the nematic phase, cholesteric phase, or smectic phase at temperatures at which it is used.

Examples of the liquid crystal are listed below.

Alkoxybenzylidene alkylaniline compounds represented by the formula below and typified by 4-methoxybenzylidene-4'-butylaniline (MBBA) and 4-ethoxybenzylidene-4'-butylaniline (EBBA)

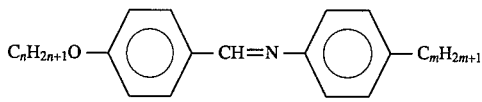

(where n and m are positive integers, and same shall apply hereunder.)

Alkylbenzylidene cyanoaniline compounds represented by the formula below and typified by 4-butylbenzylidene-4'-cyanoaniline.

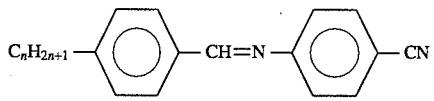

Alkoxybenzylidene cyanoaniline compounds (Schiff base liquid crystals) represented by the formula below and typified by 4-pentyloxybenzylidene-4'-cyanoaniline.

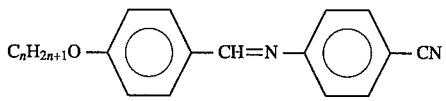

Azoxy liquid crystal compounds represented by the formula below and typified by 4l-bulyl-4-methoxyazoxygenzene and 4-hexyl-4'-butoxyazoxybenzene.

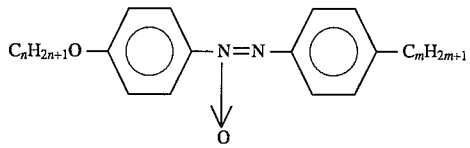

Azo liquid crystal compounds represented by the formula below and typified by 4-pentyl-4-methoxyazobenzene.

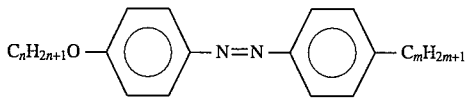

Phenyl benzoate liquid crystal compounds, biphenyl liquid crystal compounds, cyclohexylcarboxylic ester liquid crystal compounds, phenylcyclohexane liquid crystal compounds, biphenylcyclohexane liquid crystal compounds, phenylpyridine liquid crystal compounds, phenyldioxane liquid crystal compounds, cyclohexylcylohexane liquid crystal compounds, cyclohexylcyclohexane ester liquid crystal compounds, and cyclohexylethane liquid crystal compounds. They may be used alone or in combination with one another.

The liquid crystal dispersion film layer may be incorporated with a variety of additives, such as light-absorbing molecules or particles, light stabilizer, antioxidant, lubricant, surface active agent, and inorganic filler (in very small amounts), according to need.

The liquid crystal dispersion film layer should be in such a state that the matrix polymer and the liquid crystal are separated at use temperatures such that the matrix polymer takes the spongy structure and more than 60% (by volume), preferably more than 70%, of the liquid crystal communicates with at least one side of the liquid crystal dispersion film.

The spongy structure means a structure in which the matrix polymer forms a reticulate continuous phase, with its interstices (holes or closed cells) encircled by the liquid crystal. The interstices should be interconnected so as to form a passage which reaches one side, preferably both sides, of the liquid crystal dispersion film. There may be some interstices which are not interconnected long enough to form such a passage.

The liquid crystal dispersion film contains the liquid crystal which accounts for 10–95% (by weight), preferably 20–80%, of the film. With an amount less than 10%, the liquid crystal mostly dissolves in the matrix polymer, forming a homogenous mixture, in which the liquid phase exists as independent particles. The resulting liquid crystal dispersion film does not have the spongy structure of the matrix polymer. With an amount more than 95%, it is difficult to maintain the liquid crystal dispersion film, because of its high fluidity.

The liquid crystal dispersion film usually has a thickness of 2–1000 μm, preferably 5–100 μm. With a thickness smaller than 2 μm, the film will greatly fluctuate in thickness. With a thickness larger than 1000 μm, the film will require a higher driving voltage for the electro-optic effect, which leads to poor heat conduction in thermal recording.

The interstices in the matrix polymer of the liquid crystal dispersion film may have an average size smaller than 100 μm, preferably 0.5–100 μm, although it is difficult to define their size exactly because they are mostly interconnected, with some being independent from others.

The liquid crystal dispersion film may be formed from the matrix polymer and liquid crystal, which are incorporated with a solvent and additives for viscosity adjustment according to need. Any known film forming method may be employed, such as casting, spreading on water surface, doctor blading, roll coating, dipping, spraying, and electrostatic coating. The solvent is not specifically limited so long as it dissolves the matrix polymer and liquid crystal.

The liquid crystal dispersion film may be of single-layer structure; however, it is too thin (5–100 μm) to handle conveniently. It is desirable to form the film directly on a protective substrate, which may be a rigid one of glass or Nesa glass or a flexible one of PET or polyether sulfone. Where the film is used as a recording medium, the substrate should preferably be made of a thermally stable material having a low coefficient of thermal conductivity.

The liquid crystal dispersion film as an electroptic element should be provided with electrically conductive layers on both sides thereof. At least one of the conductive layers should be transparent. If both of the conductive layers are transparent, the resulting electro-optic element may be used as an optical shutter or projector-type display.

The liquid crystal dispersion film scatters light intensely in the absence of voltage, and it becomes transparent in the presence of voltage. Therefore, it can be used as an electro-optic element which scatters and transmits light.

The electrically conductive layer may be made of a transparent metal oxide such as ITO and tin oxide ($SnO_2$) or a conductive metal such as copper and aluminum. The liquid crystal dispersion film and the electrically conductive layer may be separated by an aligning layer, insulating layer, and light-absorbing metal layer (which is necessary for use as a recording element).

The aligning layer may be made of a polyester resin, polyamide resin, or polyvinyl alcohol, with its surface rubbed in the usual way or coated with an oxide, fluoride, or metal by oblique deposition. The aligning layer considerably influences the performance of the electro-optic element. It may be attached to one or both sides of the liquid crystal dispersion film. Whether the two aligning layers should be made of the same material or different materials and which direction should be chosen for rubbing all depend on the material of the aligning layer, the liquid crystal, and the matrix polymer.

There are no specific restrictions on the connection between the electro-optic element and the driving electronic circuit. It may be accomplished by a pin connector, elastic connector, flexible connector, or the like. If necessary, the electro-optic element may be used in combination with a polarizing plate, reflector, and diffuser for the conventional electro-optic element. Moreover, it may be combined with a UV filter, color filter (for color display), and non-glare filter according to specific uses.

The conventional electro-optic element based on a liquid crystal needs two rigid substrates to hold the liquid crystal and also needs a spacer to keep the substrates a certain distance apart. This poses a problem associated with strength and weight. Moreover, this structure leads to thickness fluctuation, which makes it difficult to produce the one having a large area. By contrast, the electro-optic element of the present invention has the conventional liquid crystal layer replaced by the liquid crystal dispersion film composed of a liquid crystal and a matrix polymer in a specific state. Therefore, it is advantageous in strength and weight over the conventional one and it can be produced in large size.

The liquid crystal dispersion film may be used as a heat-mode recording element because it changes in optical properties upon application of heat.

According to the present invention, the liquid crystal dispersion film is constructed such that the two phases become separated at use temperatures and become mixed at high temperatures. The change in aggregation caused by heat brings about the change in light scattering, which is optically detected and hence utilized for recording. If heat is applied such that the change in light scattering takes place reversibly, it would be possible to perform repetitive writing and erasing.

The heat application may be accomplished by the aid of a thermal head or electron beam (for direct heating) or radiation energy such as laser beam and xenon flash light. The amount of energy to be applied should be such that the liquid crystal dispersion film is heated to a temperature at which the two phases become mixed but the constituents of the recording element do not undergo heat distortion, pyrolysis, and evaporation.

In the case where radiation energy of light is sued as a heat source, the element should have a medium which absorbs light and converts it into thermal energy. If the liquid crystal dispersion film itself does not function as a light-absorbing medium, it may be provided with a light-absorbing metal layer on one or both sides thereof. Alternatively, it is possible to add light absorbing molecules or particles to the liquid crystal dispersion film at the time of its production.

The light-absorbing medium may be used alone or in combination with that of different kind. It should preferably have a high light absorptivity and a low thermal conductivity. It should preferably contain light-absorbing molecules (such as pigment) for good resolution of recorded information.

Typical examples of the light-absorbing metal layer include thin film of pure metal (such as tellurium, bismuth, selenium, antimony, arsenic, and tin), alloys thereof, and sulfides (such as antimony sulfide ($Sb_2S_3$), arsenic sulfide ($As_2O_3$), and tin sulfide (SnS)).

The light-absorbing metal layer may be formed by any known thin-film forming technology such as vacuum vapor deposition, plasma vapor deposition, and sputtering. It should be 5–500 nm thick, preferably 5–150 nm thick. With a thickness smaller than 5 nm, it is merely a monomolecular layer, which does not absorb light enough for effective heating. With a thickness larger than 150 nm, it does not effectively transmit heat to the liquid crystal dispersion film.

In the case where the liquid crystal dispersion film is provided with light-absorbing metal layers on both sides thereof, they are not necessarily to be of the same material. It is desirable that at least one of them be somewhat transparent to the record detecting light. Moreover, the liquid crystal dispersion film and the light-absorbing metal layer may be separated by an electrically conductive layer, aligning layer, and insulating layer, if the liquid crystal dispersion film is to be used as an electro-optic element.

Examples of the light-absorbing molecules are given below.

Azo dyestuffs represented by the formula below.

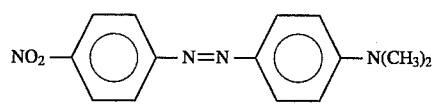

Cyanine dyestuffs represented by the formula below.

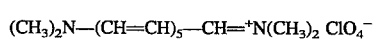

Squalium dyestuffs represented by the formula below.

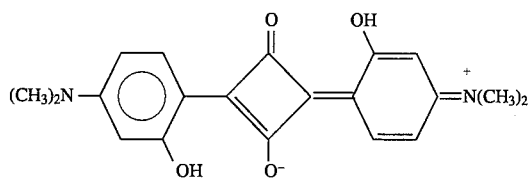

Anthraquinone dyestuffs represented by the formula below, and other organic dyestuffs such as naphthoquinone dyestuffs, quinoline dyestuffs, and phthalocyanine dyestuffs.

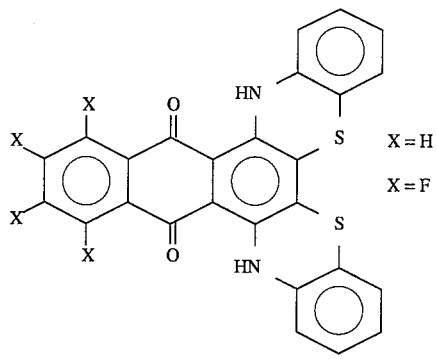

X = H
X = F

Metal complex such as thiolnickel complex represented by the formula below.

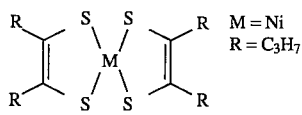

M = Ni
R = C$_3$H$_7$

They are not specifically limited so long as they absorb light and dissolve in the liquid crystal dispersion film.

Typical examples of the light-absorbing particles include metal particles (such as silver and tellurium particles), inorganic compounds (such as silver halide and iron oxide), and carbon black. They are not specifically limited so long as they absorb light and disperse into the liquid crystal dispersion film.

The amount of the light-absorbing molecules or particles to be added to the liquid crystal dispersion film is usually 0.1–100% (by weight), preferably 0.3–10%, of the film. With an amount less than 0.3%, they do not absorb light enough for effective heating. With an amount more than 10%, they prevent the formation of the liquid crystal dispersion film and lower the contrast of recording. An effective means to increase the contrast is a highly reflective metal later attached to the protective substrate. A high contrast is required to optically detect recorded information by the aid of reflected light.

Examples of the light-reflecting layers include those of aluminum, chromium, gold, platinum, bismuth, and tin. The light-reflecting metal layer may be formed by any known thin-film technology such as vacuum vapor deposition, plasma vapor deposition, and sputtering. It should have a thickness in the range of 10–1000 nm. In the case where the protective substrate is required to have a smooth surface, it is recommended to uniformly coat the protective substrate with an organic polymer, such as polyester resin and vinyl chloride resin.

The foregoing description is about the optical element of the present invention which is used as an electro-optic element or heat-mode recording element. needless to say, the use of the optical element of the present invention is not limited to them.

An example of the optical element of the present invention is illustrated in FIG. 1, which is a sectional view. There are shown a liquid crystal dispersion film layer 1, electrically conducive layers 2, and a protective layer 3. Additional layers, such as aligning layer, insulating layer, light-absorbing metal layer, and light-reflecting metal layer, may be formed between the liquid crystal dispersion film 1 and the protective substrate 3 or on the liquid crystal dispersion film 1. In this case, it is desirable that the aligning layer be close to 1 and the light-reflecting metal later be close to 3. Some of these additional layers may be replaced by a single layer having a plurality of functions, such as a light-absorbing and reflecting metal layer and a light-reflecting conductive layer.

EXAMPLES

The invention will be described in more detail with reference to the following examples.

Example 1

A polyethylene terepthalate (PET) sheet (125 μm thick) having an ITO layer formed thereon was coated by doctor blading with a solution of 0.84 g of polymethyl methacrylate (PMMA) [1], 0.84 g of nematic liquid crystal [2], and 0.0084 g of azo dyestuff [3] dissolved in 6.68 g of chloroform.
1) "Delpet N60" from Asahi Chemical Industry Co., Ltd.
2) "GR-63" from Chisso Corporation.
3) "M-618" from Mitsui Toatsu Chemicals, Inc.
The coated sheet was dried at room temperature. Thus there was obtained a liquid crystal dispersion film (18 μm thick). This coated sheet was vacuum-laminated with an ITO-coated PET sheet (125 μm thick), with the ITO later facing the liquid crystal dispersion film. The resulting laminated sheet measured 10 by 10 cm.

The thus obtained optical element intensely scattered light, but it turned transparent when a voltage of 100 V was applied across the electrodes. When it was irradiated for heating for 1 second with a 20-ms pulsed beam of visible light (wavelength 532 nm) from a pulse YAG laser ("NY60" made by Continuum Co., Ltd.), the irradiated part became transparent.

Example 2

An optical element was prepared in the same manner as in Example 1, except that the azo dyestuff was replaced by ananthraquinone dyestuff ("M-370" from Mitsui Toatsu Chemicals, Inc.). Upon irradiation with a laser beam, it gave the same result as in Example 1.

Comparative Example 1

An optical element was prepared in the same manner as in Example 1, except that the PMMA was replaced by poly-diisopropyl fumarate (made by Nippon Oil and Fats Co., Ltd.). Upon application of a voltage it functioned like the one in Example 1; however, upon irradiation with a laser beam, it was not capable of thermal recording. This is because the polydiisopropyl fumarate and liquid crystal exist in the separate state and do not mix together even when they are heated.

Comparative Example 2

An optical element was prepared in the same manner as in Example 1, except that the ITO-coated PET film was coated with an azo dyestuff ("M-618" from Mitsui Toatsu Chemical Co., Ltd.) alone. It did not respond to the application of a voltage but it did to the irradiation with a laser beam, with dyestuff undergoing thermal change for recording.

Example 3

Figure 2:
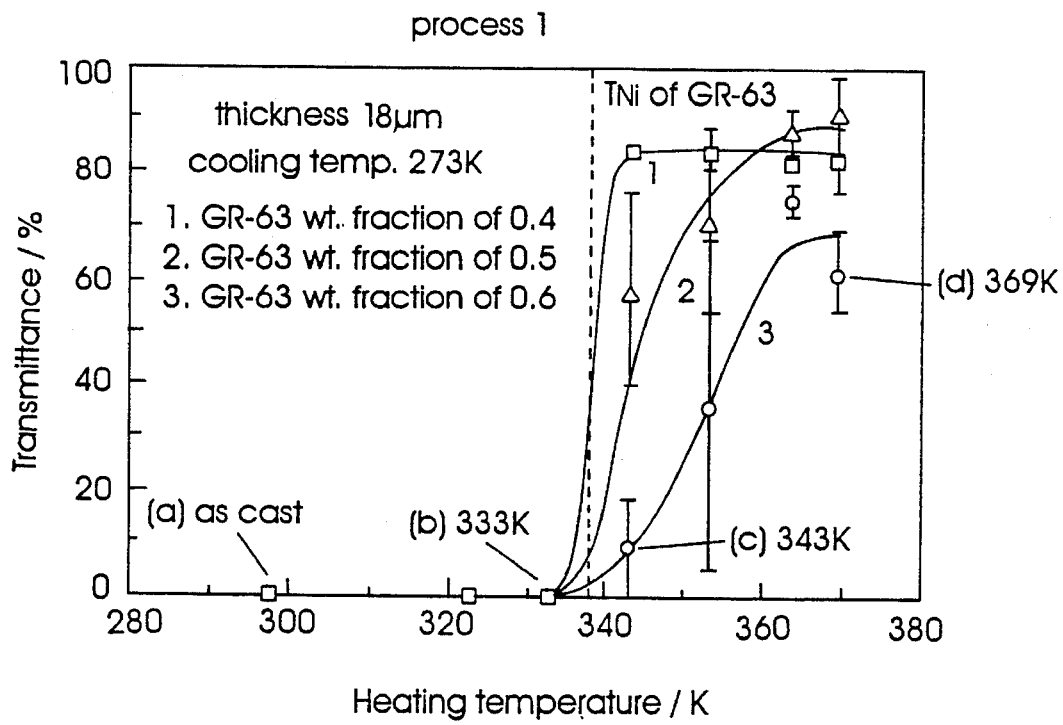
FIG. 2 illustrates the outline of the process and the relationship between the heating temperatures and the transparencies of the films after cooling.
Figure 2:
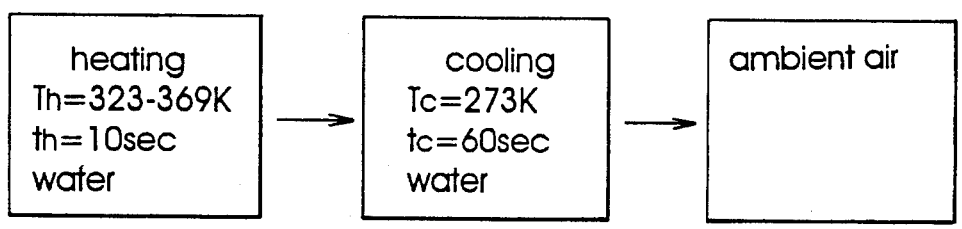
Figure 3A:
FIG. 3 shows the photographs of the films by way of a scanning type electronic microscope.
Figure 3B:
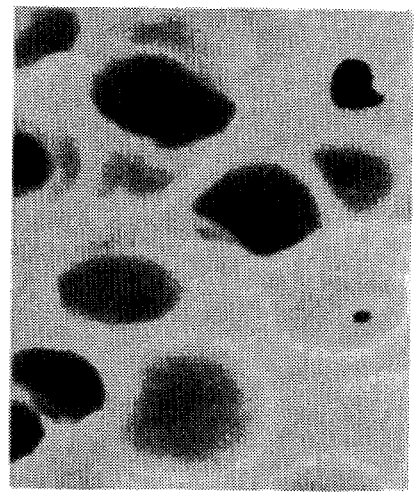
Figure 3C:
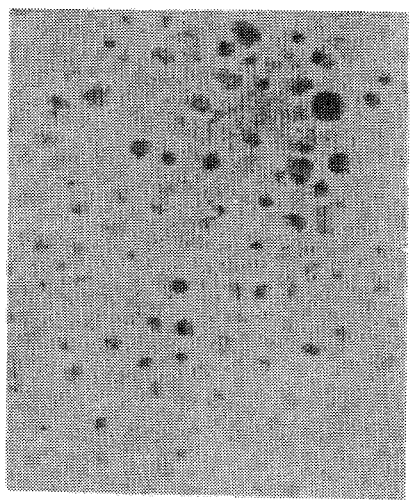
Figure 3D:
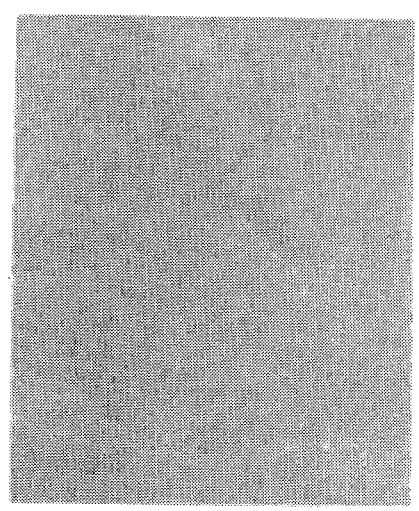
Figure 4:
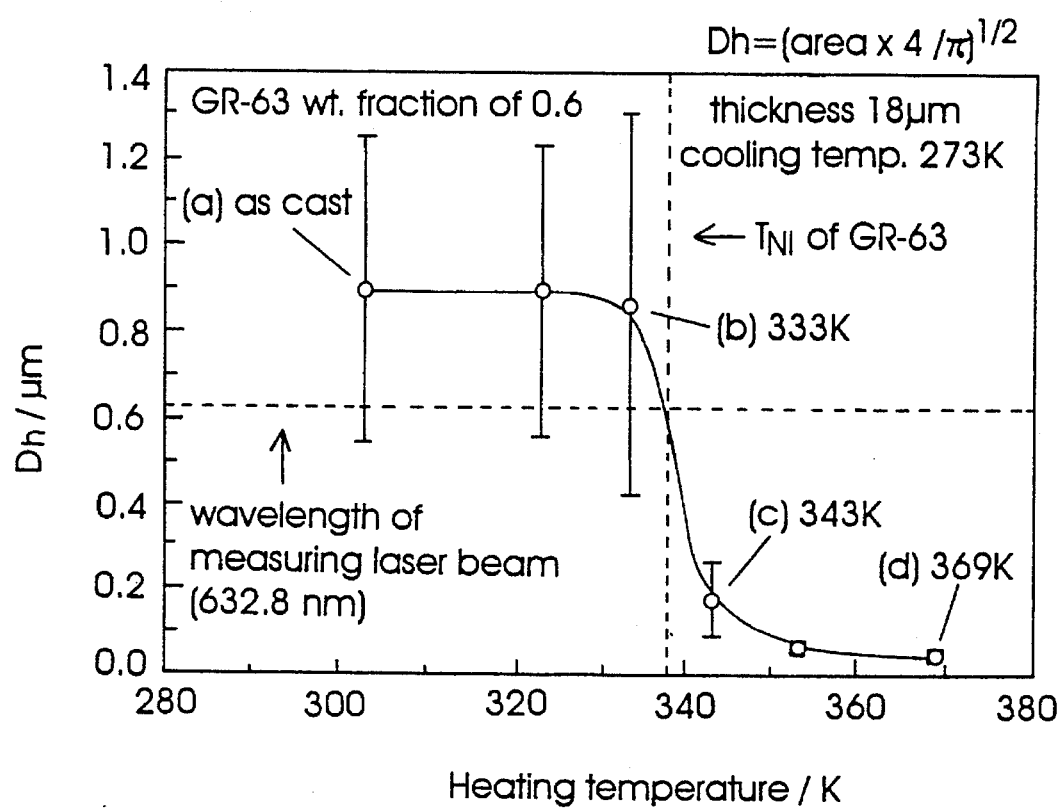
FIG. 4 illustrates the particle diameter of liquid crystal (equivalent circle diameter Dh: the diameter of the circle of the same area; see FIG. 4) abstained by subjecting the electronic microscope photographs of FIG. 3 to picture-treatment by way of a computer (made by Japan Avionics Company: IVIP-4100).
Figure 5:
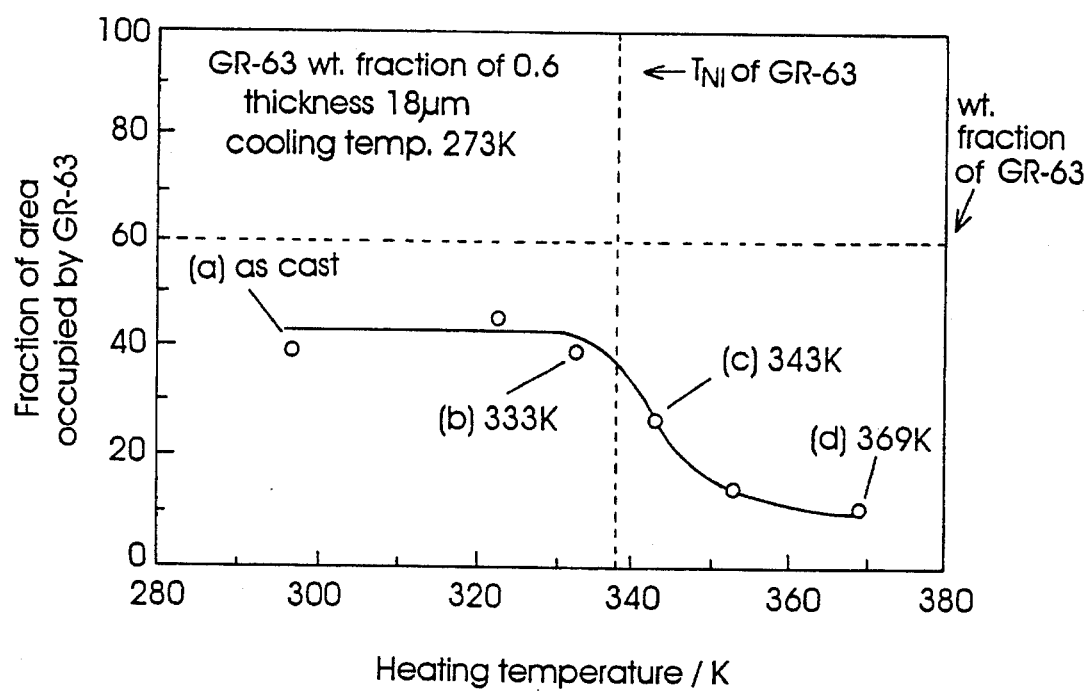
FIG. 5 illustrates the area occupation fraction (note: the occupation fraction of the liquid crystal portion in the picture surface).

Three films (3-1, 3-2 and 3-3) of an optical element obtained according to the same process as in Example 1 were individually heated up to certain definite temperatures in a water bath, followed by cooling each at the same temperature (273 K.) to obtain transparent films (optical elements), and measuring the light transmittances of the respective films, to examine the influence of the initial heating temperatures. FIGS. 2–5 are directed to explanatory views illustrating the experimental conditions and the results in Example 3. Namely, FIG. 2 illustrates heating and cooling treatment conditions and the results (relationship between the transparency and the heating temperature), and FIG. 3 illustrates the electronic microscope photographs of liquid crystal particles of the respective films obtained in the process 1 of FIG. 2. FIG. 4 illustrates a graph showing the relationship between Dh (particle diameter) and the heating temperature. FIG. 5 illustrates the relationship between the area occupation fragment of liquid crystal particles and the heating temperature. The higher the heating temperature, the higher the transparency, and the lower the GR-63 wt. fraction, the higher the transmittance (FIG. 2) (but, in the cases of No. 3-1 and No. 3-2, this tendency is reversed at 360 K.). When Th (heating temperature) exceeds $T_{NI}$ (phase transition point of liquid crystal), the film changes into compatible state (transparency). As seen from FIGS. 4 and 5, when the initial heating temperature exceeds $T_{NI}$, the film (note: the optical element of the present invention) is changed into a compatible state, even if after cooling.

Example 4

A plurality of optical elements obtained according to the same process as in Example 1 were heated up to the same temperature (369 K.) in a water bath, followed by measuring the light transmittance of the resulting films, to examine the influence of cooling temperatures. FIGS. 6 to 9 illustrate explanatory view showing the experimental conditions and the results in FIG. 4. In contrast to the case of Example 3, FIGS. 6 and 7 respectively illustrate the given process 2 and the electronic microscope photograph of the respective films obtained in the process.

Figure 6:
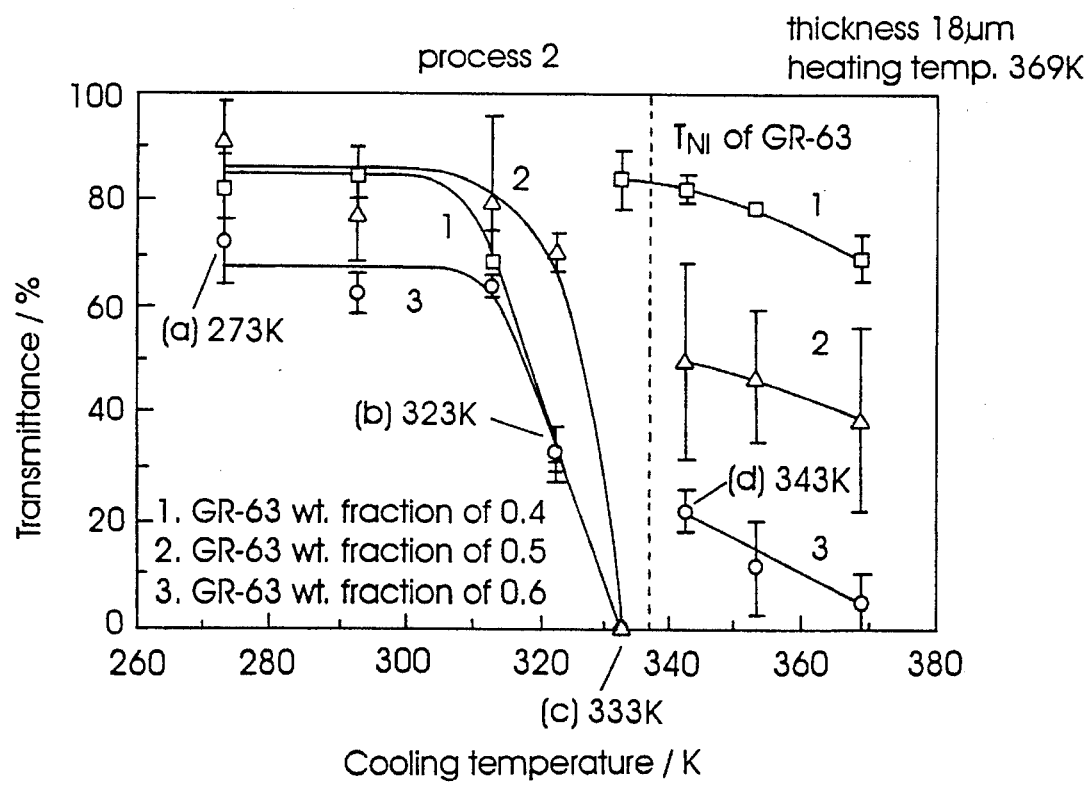
FIG. 6 illustrates the outline of the process and the relationship of the transparency of the films after cooling.
Figure 6:
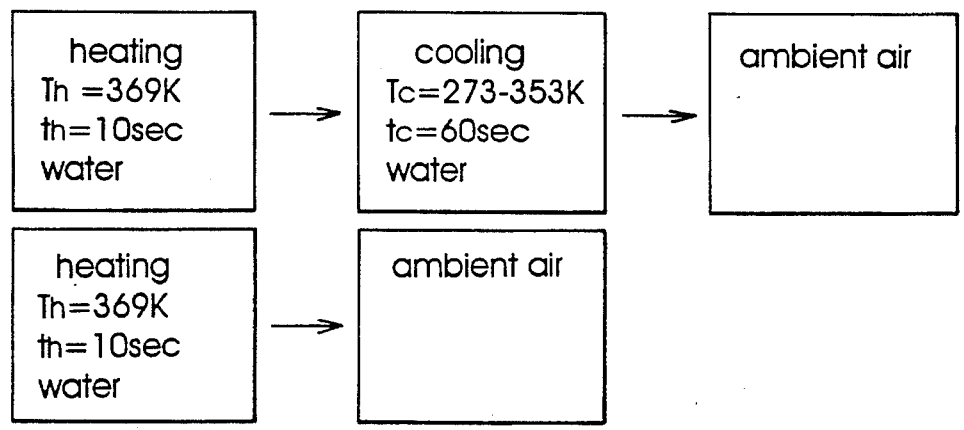
Figure 7A:
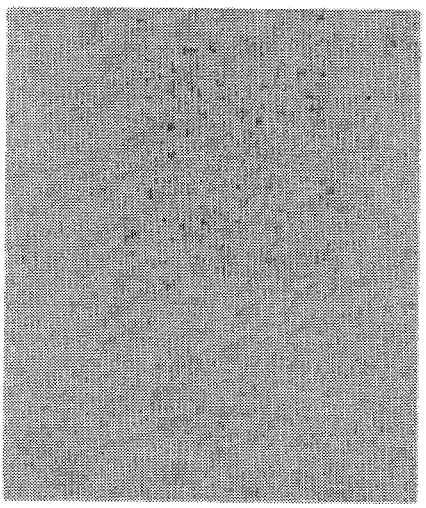
FIG. 7 illustrates the scanning type electronic microscope photographs of the films.
Figure 7B:
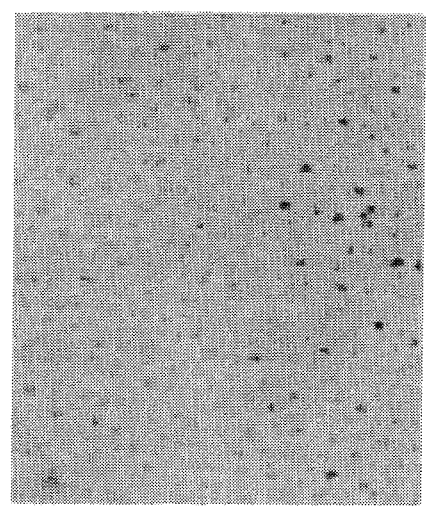
Figure 7C:
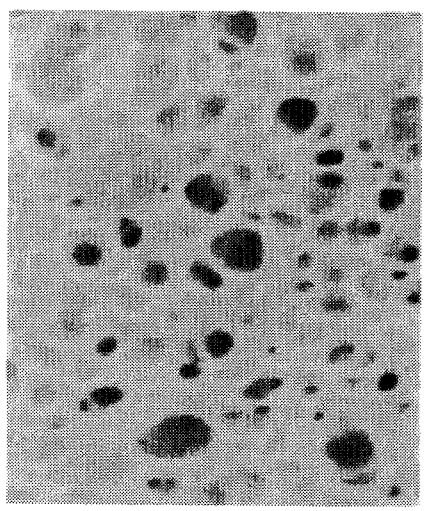
Figure 7D:
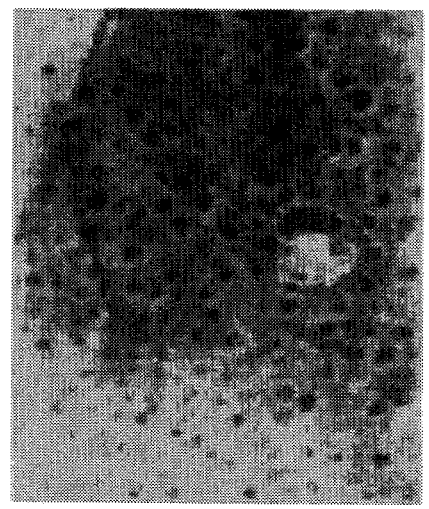

As apparent from FIG. 6, as to the same fractions, the lower the cooling temperature, the higher the clearance. Among the fractions, the film of the middle fraction (0.5) has a higher transparency.

Further, as apparent from FIG. 7, in the case where the cooling temperature $T_C$ is lower than $T_{NI}$, the lower the cooling temperature, the smaller the particle diameter of the liquid crystal.

On the other hand, in the case where Th is higher than $T_{NI}$, it is considered that the cooling speed of the film (optical element of the present invention) at a temperature higher than the temperature ($T_{NI}$) at which the aggregation structure of dispersed particles of liquid crystal in the film is considered to be changed, is similar to the case where the film is allowed to cool down in air (at room temperature).

Figure 8:
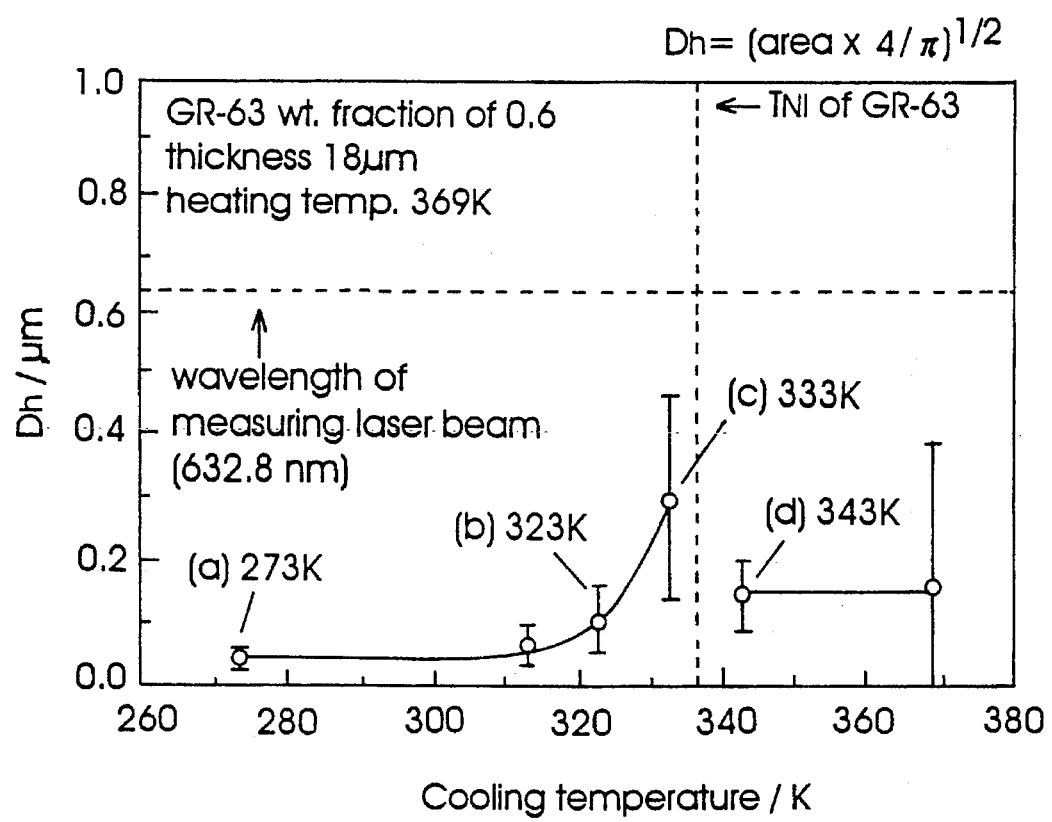
FIG. 8 illustrates a relationship between the particle diameter of liquid crystal and the cooling temperature, and further illustrates the relationship between Dh of the film obtained by process 2 and the cooling temperature.
Figure 9:
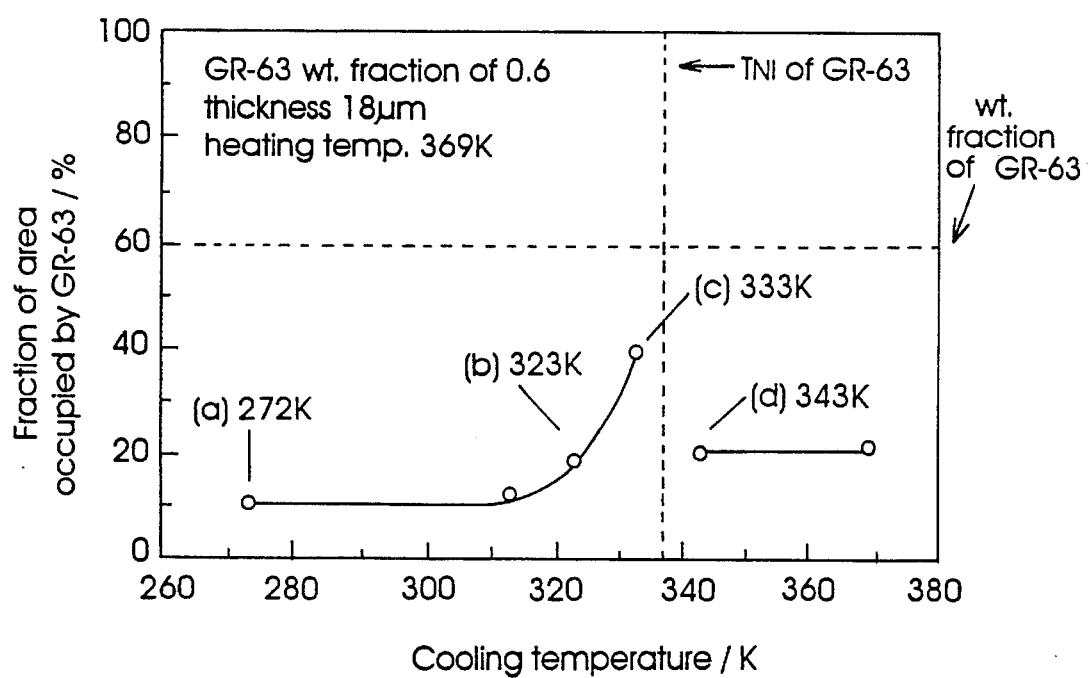
FIG. 9 illustrates a relationship between the area occupation fraction and cooling temperature, and further illustrates the relationship between the area occupation fragment of liquid crystal particles and the cooling temperature.
Figure 10:
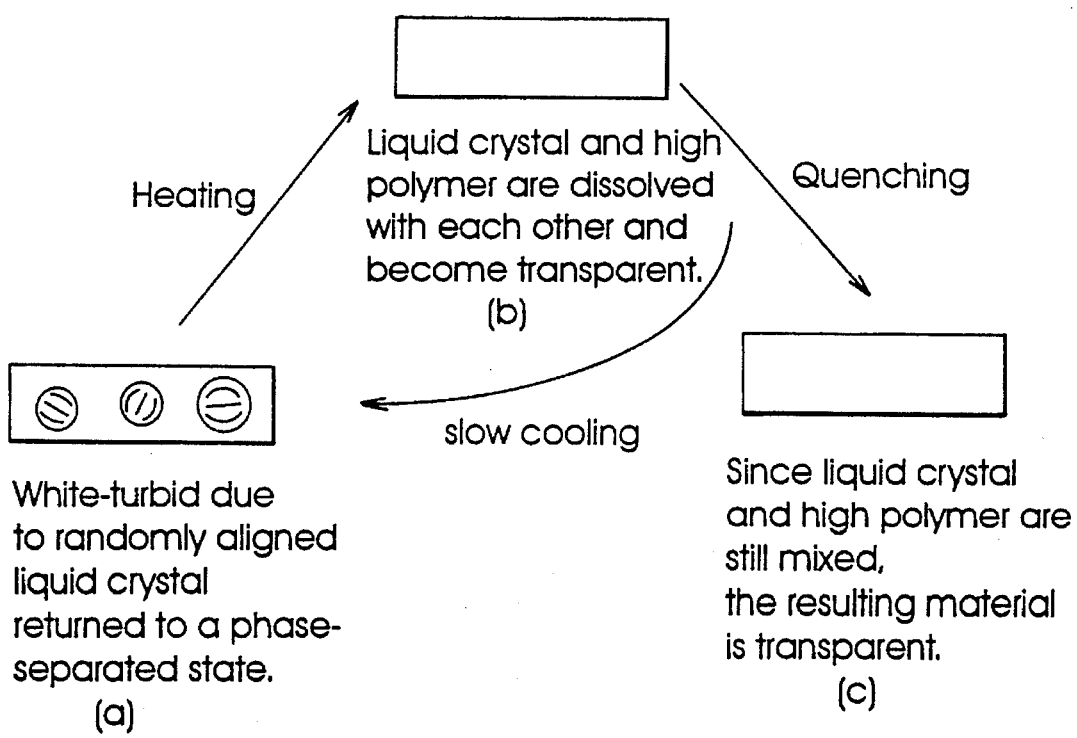
FIG. 10 illustrates the functioning of the optical element of the present invention.

FIGS. 8 and 9 each back the tendencies of FIGS. 6 and 7 by the particle diameter or the area occupation fraction.

The present invention provides a new optical element which changes in the light-scattering properties upon application of electric field or heat. It can be made in large area and it is advantageous in strength and weight over the conventional one.

We claim:

1. An optical element comprising a liquid crystal dispersion film layer composed of a spongy matrix polymer and a liquid crystal wherein the spongy matrix polymer and the liquid crystal become phase separated at use temperatures and mixed at high temperatures, wherein the liquid crystal dispersion film layer becomes transparent upon the application of heat and remains transparent upon quenching because the liquid crystal and spongy matrix polymer are still mixed, and wherein the liquid crystal dispersion film layer returns to a phase-separated state upon slow cooling.

2. The optical element of claim 1, wherein the liquid crystal dispersion film layer is interposed between electrically conductive layers.

3. The optical element of claim 1, wherein the liquid crystal dispersion film layer is provided with a light-absorbing metal layer on one or both sides thereof.

4. The optical element of claim 1, wherein the liquid crystal dispersion film layer contains light-absorbing molecules or particles.

5. The optical element of claim 1, further comprising an electrode such that the optical element may be used as an electro-optical element.

6. The optical element of claim 1, wherein a light absorptive metal layer is provided on one side or both sides of the liquid crystal dispersion film layer.

7. The optical element of claim 1, wherein the liquid crystal dispersion film layer further comprises a light absorptive molecule or particle capable of converting light energy into thermal energy.

8. The optical element of claim 1, wherein the matrix polymer is selected from the group consisting of thermoplastic resins, vinyl acetate resin, cellulosic resin, linear polyester resin, styrene resin, amide resin, nitrile resin, acetal resin, synthetic and natural rubbers, butadiene rubber, butyl rubber, isoprene rubber, acrylic rubber, nitrile rubber, urethane rubber, fluororubber, chloroprene rubber, silicone rubber, and thermosetting resins.

9. The optical element of claim 1, wherein the thickness of the liquid crystal dispersion film is 2–1000 μm.

10. The optical element of claim 1, wherein the liquid crystal dispersion film is formed directly on a protective substrate.

11. The optical element of claim 1, wherein the liquid crystal dispersion film is used as a recording medium.

12. The optical element of claim 1, wherein the liquid crystal dispersion film is provided with electrically conductive layers on both sides thereof with at least one layer being transparent.

13. The optical element of claim 2, wherein the liquid crystal dispersion film and the electrically conductive layer are separated by an aligning layer, insulating layer, and light-absorbing metal layer.

14. The optical element of claim 4, wherein the light-absorbing molecules or particles are selected from the group consisting of azo dyestuffs, cyanine dyestuffs, squalium dyestuffs, anthraquinone dyestuffs, naphthoquinone dyestuffs, quinoline dyestuffs, phthalocyanine dyestuffs, metal complexes, metal particles, inorganic compounds and carbon black.

* * * * *